United States Patent [19]

Squires et al.

[11] Patent Number: 5,184,489

[45] Date of Patent: Feb. 9, 1993

[54] DEVICE FOR SECURELY MOUNTING AUDIO EQUIPMENT IN A MOTOR VEHICLE

[76] Inventors: Carlton G. Squires, 92 Blanchard Crescent, London, Ontario, Canada, N6G 4E5; Leslie A. Squires, 17 Glenwood Rd., Ingersoll, Ontario, Canada, N5C 3N7

[21] Appl. No.: 748,516

[22] Filed: Aug. 22, 1991

[51] Int. Cl.⁵ .................... A47B 81/06; E05B 73/00
[52] U.S. Cl. .................... 70/58; 296/37.12; 312/7.1; 312/319.7; 70/57; 70/258
[58] Field of Search ............. 70/58, 57, 258, 237; 312/7.1 X, 319 X; 296/37.8, 37.12 X; 248/27.1, 551, 207

[56] References Cited

U.S. PATENT DOCUMENTS

| | | |
|---|---|---|
| Re. 33,112 | 11/1989 | Durham ............ 296/37.8 |
| 4,248,069 | 2/1981 | Burbank ............ 70/258 |
| 4,660,900 | 4/1987 | Paterlini ............ 312/7.1 |
| 4,684,164 | 8/1987 | Durham ............ 296/378 |
| 4,726,632 | 2/1988 | Pori ............ 312/7.1 |
| 4,884,646 | 12/1989 | Zambias ............ 70/58 |
| 4,941,718 | 7/1990 | Alexander, III et al. ...... 296/37.8 |
| 4,979,774 | 12/1990 | Houser ............ 312/7.1 |
| 4,995,680 | 2/1991 | Mirori ............ 312/7.1 |

*Primary Examiner*—Renee S. Luebke
*Assistant Examiner*—D. Baucher
*Attorney, Agent, or Firm*—Daryl W. Schnurr

[57] ABSTRACT

An anti-theft mounting for radios, stereos and similar audio equipment used in motor vehicles has several features to discourage and possibly prevent the theft of the equipment. The audio equipment is mounted within an opening in a dash of a motor vehicle. The equipment is partially mounted within a housing which moves forward so that a front of the equipment extends out of the opening when the equipment is desired to be used and moves rearward when the equipment is not desired to be used. When the equipment is in the rearward rest position, a door closes the opening. When the equipment is desired to be operated, the door opens and the equipment protrudes at least partially from the opening for easy access. The opening is sized so that the audio equipment will fit snugly within the opening but the housing will not. The mounting has control means connected to an ignition of the motor vehicle so that when the motor vehicle is operating, the equipment will be in the forward operating position. Similarly, when the motor vehicle is not operating, the equipment will automatically return to the rearward rest position. When the door is closed, it will be locked. When a person legitimately desires to remove the equipment, this can be accomplished easily with special tools. Previous anti-theft devices for radios and the like do not provide sufficient protection for the radio or do not provide appropriate access to the radio when it is desired to be used.

14 Claims, 10 Drawing Sheets

DEVICE FOR SECURELY MOUNTING AUDIO EQUIPMENT IN A MOTOR VEHICLE

BACKGROUND OF THE INVENTION

1. Field of the Invention

This invention relates to a secure mounting for using and storing audio equipment in a motor vehicle and, more particularly, to a mounting that automatically moves the radio inside an opening within the dash when the vehicle is not operating and closes and locks a door in position over said opening.

2. Description of the Prior Art

Anti-theft devices for radios and stereo equipment in motor vehicles are known. U.S. Pat. No. 4,726,632 to Pori discloses an anti-theft assembly to fasten a radio receiver into dashboards of motor vehicles. In the Pori patent, a radio is located within a housing, which in turn is located within an opening of a dashboard. Two doors are pivoted to a wall of the housing for closing the opening. The housing is maintained in a fixed position and the radio is movable between a recessed position within said dashboard and an extended position where a front surface of the radio is substantially flush with the opening. The doors are hinged to an upper and lower front edge of the housing. When the radio is in an extended position, the doors are open and in a horizontal position. When the radio is moved rearward, the movement of the radio pulls the doors closed. The radio is held within the housing by a single pin. Unfortunately, this device has some disadvantages in that the front doors can be pried open and the radio can be forced from the housing by overcoming the force of the single pin holding the radio within the housing. Also, when the radio is in an extended position, the doors can interfere with user access to the radio. Also, the radio described in Pori can be difficult to remove when the owner of the vehicle requires the radio to be replaced without breaking or bending the single pin.

U.S. Pat. No. 4,884,646 to Zambias describes an anti-theft device for automobile audio equipment in which the radio remains in a fixed recessed position within an opening in the dash of a motor vehicle. A sliding door is movable between a closed position blocking the opening and an open position permitting access to the radio. The door slides vertically upward and downward within suitable channels and is operable by means of a switch on the dash. The door extends beyond a lower edge of the opening so that the door cannot be easily pried open. This device suffers from a disadvantage in that the radio is not readily accessible to a user when the door is open. For example, particularly when the user is a driver, it can be difficult to tune or otherwise adjust the radio. Often, the user's vision of the radio will be blocked by a hand of the user which is inserted into the opening to adjust the radio. Also, if a thief is able to smash or otherwise remove the door, the radio is no more difficult to remove than a radio that is not recessed.

SUMMARY OF THE INVENTION

It is an object of the invention to provide a secure mounting for audio equipment in a motor vehicle where the equipment is difficult to steal when not in use but equally accessible to a user to conventional audio equipment when in use.

It is a further object of the present application to provide a secure mounting for audio equipment used in motor vehicles whereby theft of the equipment is made extremely difficult; the equipment is readily accessible to a user when it is desired to operate the equipment; the equipment automatically moves from an operating position to a storage position and vice-versa; the equipment can be easily removed by or on behalf of an owner who possesses the appropriate tools; it is extremely difficult to pry open the door or to smash the door in without damaging the equipment; and the equipment is very difficult to remove without the proper tools, even if the door has been opened.

A secure mounting for using and storing audio equipment and the like is used in a motor vehicle having a dash with an outer surface and a suitable opening therein and sufficient space behind said dash to accommodate the mounting and the equipment. The equipment has a front, rear, two sides, top and bottom with adjustment means on a front surface thereof. The motor vehicle has a power source for moving the mounting and an ignition. The equipment has attachment means thereon, said mounting having:

(a) a housing affixed to attachment means on said equipment, a portion of said equipment extending beyond said housing, said housing and said equipment being immovable relative to one another, said housing being larger than said opening;

(b) power means connected between said power source and said movable housing to move said housing and said equipment between a rearward rest position and a forward operating position said equipment being immovable relative to said housing;

(c) in said forward position, at least said front of said equipment extends into said opening, said rear and said housing remaining behind said opening, and in said rearward position, said front of said equipment being located behind said opening.

DESCRIPTION OF A PREFERRED EMBODIMENT

Figure 1:
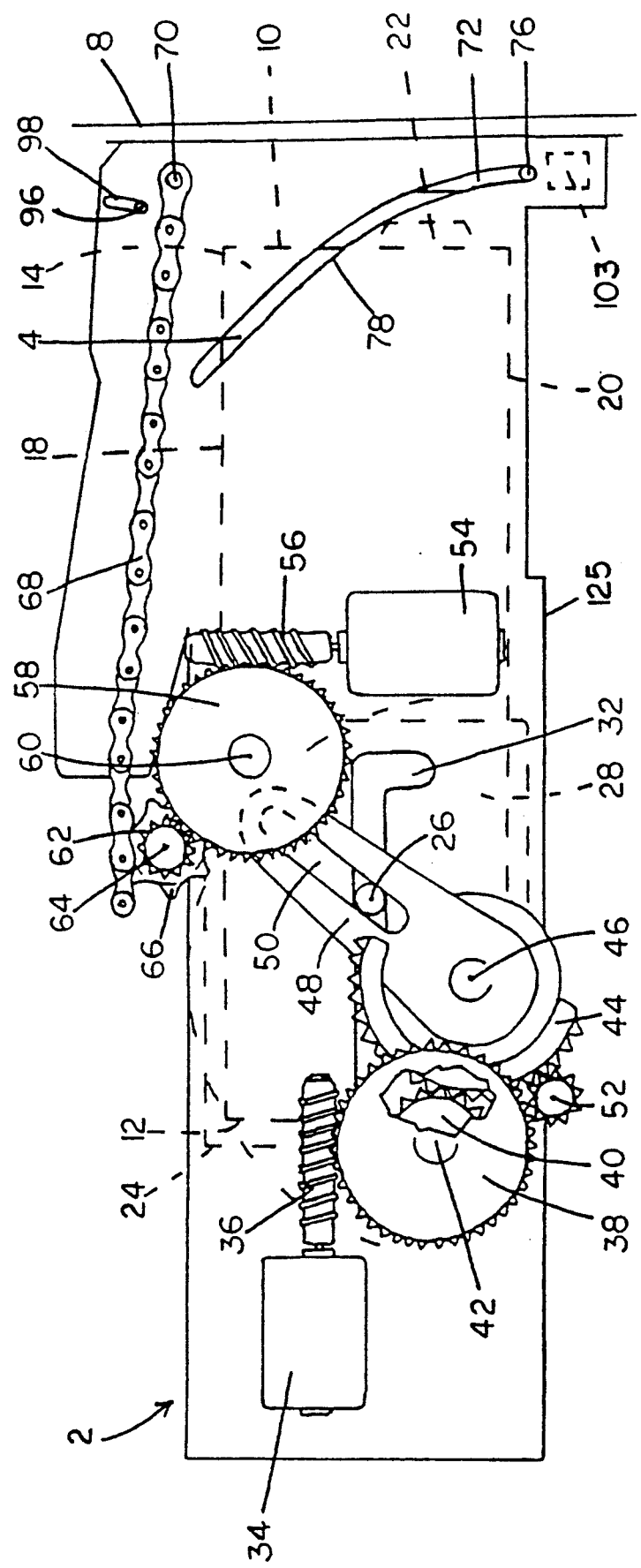
FIG. 1 is a partial side view of a radio contained in a movable housing with a door in a closed position.

In FIG. 1, there is shown a partial side view of a secure mounting 2 whereby audio equipment 4 (for example, a radio) can be stored within an opening (not shown in FIG. 1) of a dash 8 within a motor vehicle (not shown). The radio has a front 10, a rear 12, two sides 14, 16 (only one of which is shown in FIG. 1), a top 18 and a bottom 20. Adjustment means 22 are located on a front 10 of the radio 4.

The radio 4 is mounted partially within a housing 24, said housing having two projections 26 that are mounted on an outer surface of said housing 24 so that the projections can move vertically a predetermined distance relative to the radio. There is one projection 26 on each side 28, 30 (only one of which is shown in FIG. 1) of the housing 24. Though it is preferred, it is not essential that a housing be utilized to partially contain the radio. For example, the projections could each be located in a plate which is rigidly affixed to one side of the radio. Each projection 26 is slidably mounted in guide means 32. Preferably, the guide means 32 is an L-shaped slot. An electric motor 34 has a threaded shaft 36 which is mounted to engage a first gear 38. The motor 34 is connected to the electrical system of the motor vehicle (not shown) in a conventional manner.

A second gear 40 is located behind the gear 38. The gears 38, 40 are mounted on the same shaft 42. The second gear 40 is engaged with a third gear 44, which is mounted on a shaft 46. Also mounted on the shaft 46 is an arm 48, said arm containing a slot 50. The projection 26 extends into the slot 50. The third gear 44 is also engaged with a fourth gear 52, which is connected to an identical drive arrangement on the side 30 of the housing 24. The third gear 44, the fourth gear 52, the arm 48 and the slot 50 are arranged identically on the side 30 of the housing 24 to the arrangement shown on side 28 as shown in FIG. 1. The projection 26 extends through the L-shaped slot 32 and into the slot 50. The slot 32 is L-shaped so that the projection 26 will be located in a vertical portion of the slot when the radio is in the forward position. As the projection 26 is movable vertically relative to the radio, the projection will fall into the vertical portion of the slot when the radio and housing moves forward by a sufficient amount. Thus, the radio will be locked in that position as the projection cannot move rearward until the arm 48 moves.

A second motor 54 has a threaded shaft 56 which is engaged with fifth gear 58. The sixth gear 59 is located behind the fifth gear 58 and both are pivoted on rod 60 and move identically. The sixth gear 59 is engaged with a seventh gear 62 mounted on a shaft 64. If desired, one gear could be used to replace the two gears 58, 59. Also mounted on the shaft 64 is an eighth gear 66 which turns as the shaft 64 turns. A gear identical to the eighth gear 66 is located on an opposite side 30 of the housing 24 to that shown in FIG. 1. The eighth gear 66 is engaged with a link chain 68, one end of which is pivotally connected at a pin 70 to an upper end of the door 72. An identical link chain 68 is attached to an opposite side of the door 72.

First locking means 74 are located at an upper edge of the door 72 to lock the door in a closed position. A lower end of the door 72 contains a pin 76 that is slidably mounted within a groove 78 to guide the door as it opens and closes. Both the first motor 34 and the second motor 54 are connected in a conventional manner to the electrical system of the motor vehicle (not shown).

Figure 2:
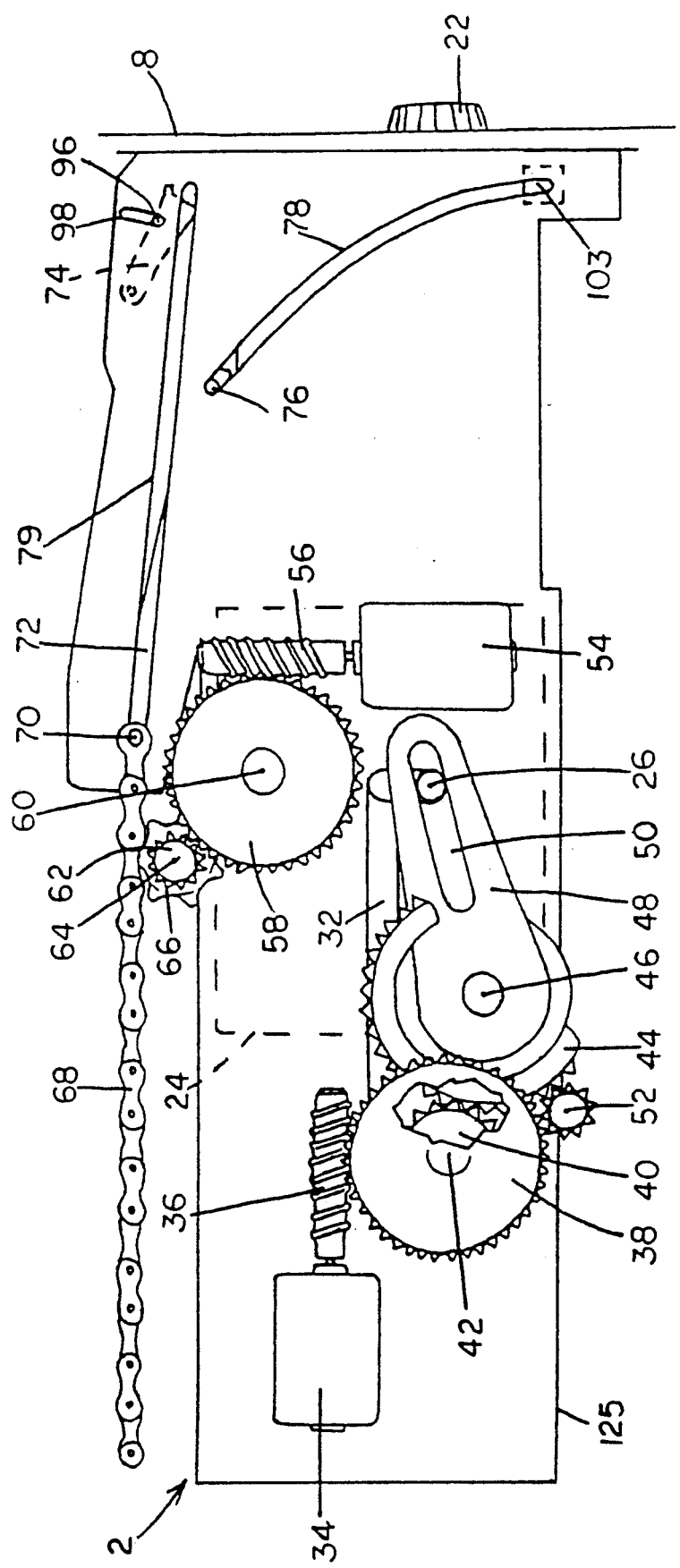
FIG. 2 is a partial side view as shown in FIG. 1 with the door open.

In FIG. 2, there is shown a side view of the secure mounting 2 that is similar to FIG. 1 except that the door 72 is in an open position. The raised portion 77 (see FIG. 3) is omitted in FIG. 2. When the door 72 of FIG. 2 is closed, it is recessed relative to the dash 8. By comparing FIGS. 1 and 2, it can be seen that when the motor 34 is activated, the first gear 38 and thereby the second gear 40 are rotated in a counterclockwise direction. This in turn causes the third gear 44 and the arm 48 to rotate in a clockwise direction. As the arm 48 continues to rotate in a clockwise direction, the projection 26 is moved along the L-shaped slot 32 from the position shown in FIG. 1 until it reaches the end of the slot in the position shown in FIG. 2. This, in turn, causes the radio 4 to move from the position shown in FIG. 1 to the position shown in FIG. 2. In order to return the radio from the forward position shown in FIG. 2 to the rearward position shown in FIG. 1, the motor 34 is caused to rotate the shaft 36 in an opposite direction.

Prior to the radio moving from the rearward position to the forward position, the door 72 must be opened. Preferably, when the door 72 is closed, the radio 4 is located immediately behind said door. When it is desired to move the radio from the rearward position to the forward position, the radio is first moved rearward briefly to provide sufficient room for the door 72 to open. The radio is moved rearward simply by causing the first motor 34 to rotate the shaft 36 in a direction so that the first gear 38 will turn in a clockwise direction. After this initial movement rearward, the second motor 54 is activated to turn the shaft 56 in such a direction so that the fifth and sixth gears 58, 59 will rotate in a clockwise direction. This in turn will cause the seventh gear 62 and the eighth gear 66 to rotate in a counterclockwise direction, thereby moving the chain 68 rearward. A pin 70 on the upper part of the door 72 has groove 79 to provide guide means as the door is opened or closed. As the chain 68 is moved rearward, an upper part of the door 72 will be pulled rearward and a lower part of the door 72 will be pulled upward and rearward with the pins 76, 70 sliding within the grooves 78, 79 respectively to the position shown in FIG. 2.

Figure 3:
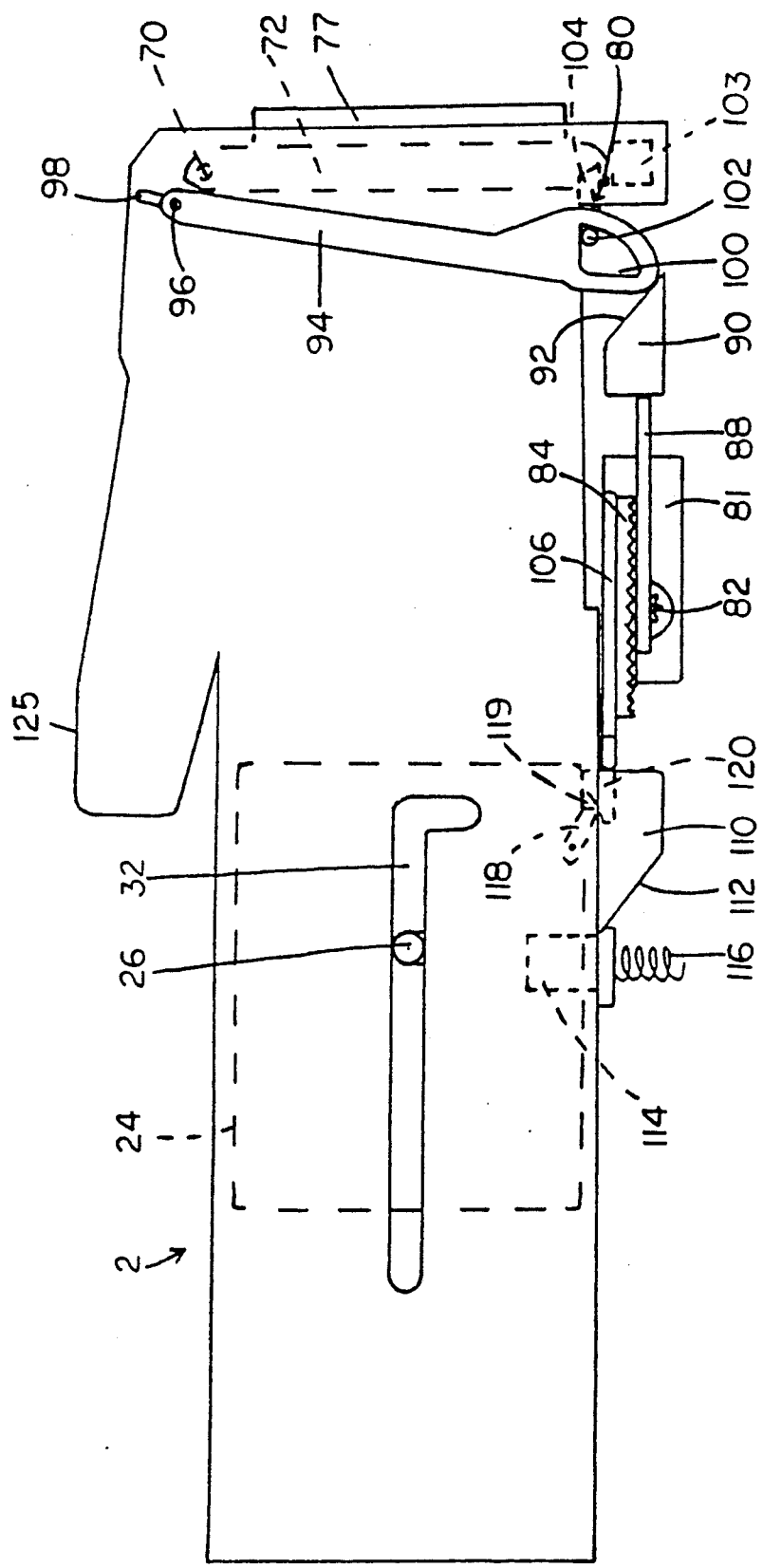
FIG. 3 is a partial side view of the housing and radio with the door in a closed position and with a drive system removed.
Figure 4:
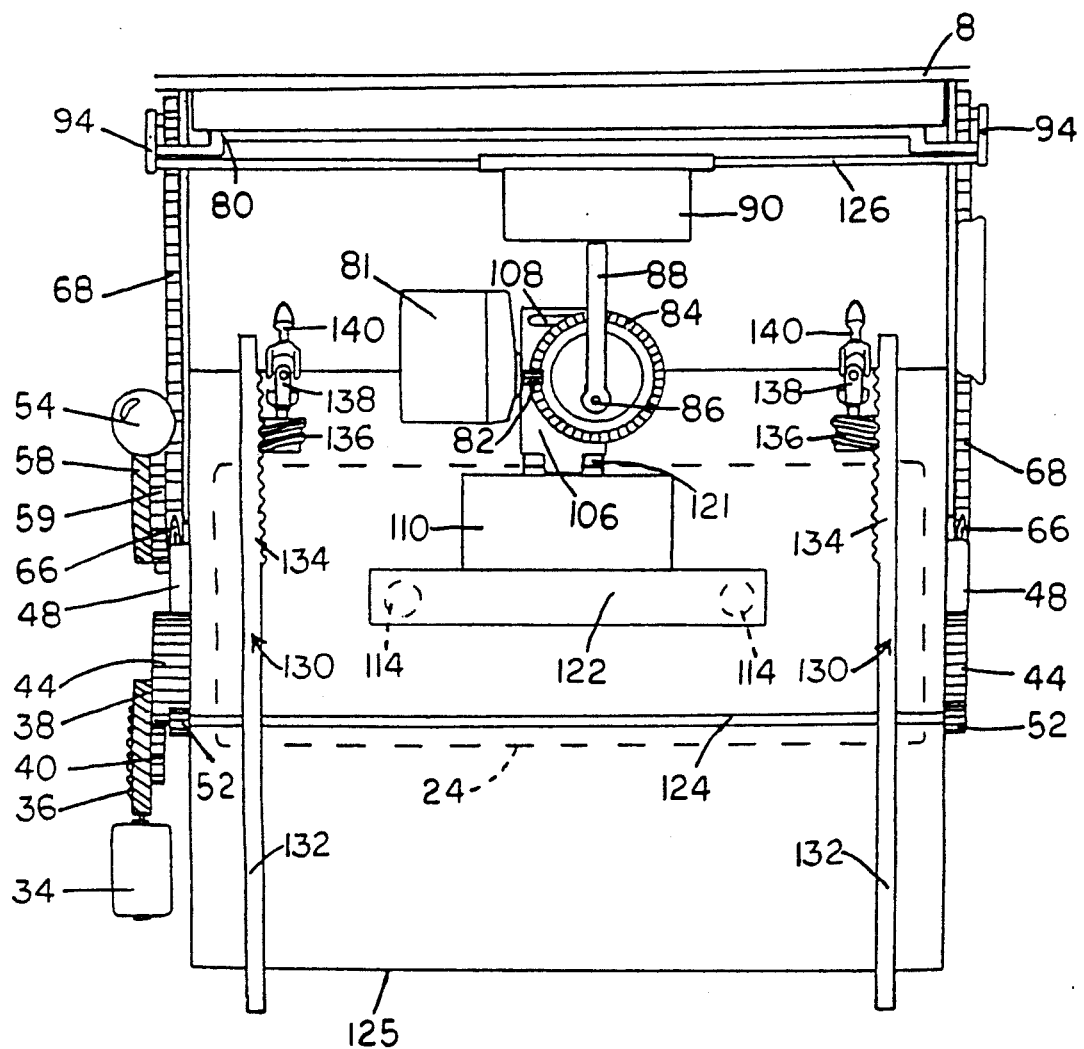
FIG. 4 is a bottom view of the radio and housing.

Just prior to the door 72 being opened, the first locking means 74 and a second locking means 80 must be released. The first locking means 74 on the upper part of the door as well as locking means 80 on the lower part of the door, are best shown in FIGS. 3 and 4, are controlled by the operation of a third motor 81. While the locks preferably extend across the entire width of the door, it is not necessary that they do so. The third motor 81 has a geared shaft 82 which engages a circular gear 84. Eccentrically and pivotally mounted on the circular gear 84 at a pivot point 86 is an arm 88. In the position shown in FIG. 4, the arm 88 is in the most rearward position and rests against the block 90. The block 90, has a tapered front surface 92 which rests against a rod 126 attached to a lower end of a locking release arm 94. An upper end of the locking release arm 94 is pivotally connected to a pin 96 located in the upper locking means 74 (see also FIG. 2). The door 72 has a raised central portion 77 added so that the door will be flush with the dash 8 (not shown in FIG. 3).

A lower portion of the locking release arm 94 contains a loop 100. Within the loop 100, there is located a rear portion 102 of the lower locking means 80. The lower locking means 80 is spring-mounted (not shown)

in a direction towards the door, the door having a suitable opening to receive a locking pin 104. The upper lock 74 is spring-mounted (not shown) in a slot 98 in a downward direction. Further, the block 90 is spring-mounted (not shown) in a rearward direction towards the arm 88. Beneath the door 72 is a spring-mounted base 103, which moves upward to be flush with a bottom of the opening 6 when the door 72 is opened.

Above the circular gear 84, there is located a plate 106, which contains a channel 108. A pin (not shown) on an upper surface of the circular gear 84 extends into the channel 108. A rearward edge of the plate 106 rests against a wedge 110. The wedge 110 has a tapered rear surface 112 which is in contact with two locking pins 114. The locking pins 114 are spring-mounted on springs 116. The pins 114 extend into suitable openings (not shown in FIGS. 3 and 4) in the bottom of the radio 4 when a spring-loaded catch 118, which is located in the bottom of the housing 24, moves wedge 110 out of the way to expose the openings. The wedge 110 can continue rearward to move a connecting band 122 out of the way and to move the pins 114 out of the radio.

In operation of the third motor 81, which is connected by conventional means to a power source in the motor vehicle (not shown), when the shaft 82 of the motor 81 is rotated to rotate the circular gear 84 in a counterclockwise direction, the arm 88 is forced against the block 90, pushing the block 90 forward. This causes the lower end of the arm 94 to ride upward along the tapered front surface 92 of the block 90. As the arm 94 moves upward, the rear portion 102 within the loop 100 is pulled rearward, pulling a pin 104 from the door. Simultaneously, the upper end of the arm 94 slides pin 96 upwardly in the slot 98 and ultimately lifts the upper locking means 74 away from the door 72. Thus, the upper and lower locking means 74, 80 of the door 72 are unlocked.

Simultaneously, the rotation of the circular gear 84 causes the plate 106 to move rearward against the wedge 110. As the plate 106 moves rearward, it first forces ridge 120 rearward so that the sloped rear portion of the ridge 120 will cause catch 118 to override projections 119, thus allowing wedge 110 to begin moving rearward. The projections 119 and the ridge 120 extend through slot 121 in a bottom of the frame 125. The frame 125 forms an outer shell for the housing 24 and the radio 4. The ridge 120 is spring-loaded to push the ridge forward (see also FIGS. 11 and 12). As the plate 106 and the wedge 110 continue rearward, a connecting bar 122 is forced downward by the sloped rear portion of the wedge 110, thus removing pins 114 from the radio 4 and the housing 24. This allows the radio to move rearward initially in order to allow the door to open and, thereafter, to move forward to the operating position shown in FIG. 2.

The motor 81 does not reverse to cause plate 106 and arm 88 to return to the position shown in FIGS. 3 and 4 until the radio has moved fully forward. The wedge 110 does not return to the position shown in FIGS. 3 and 4 until the radio returns to the storage position and, thus, the pins 114 remain beneath the housing.

Figure 5:
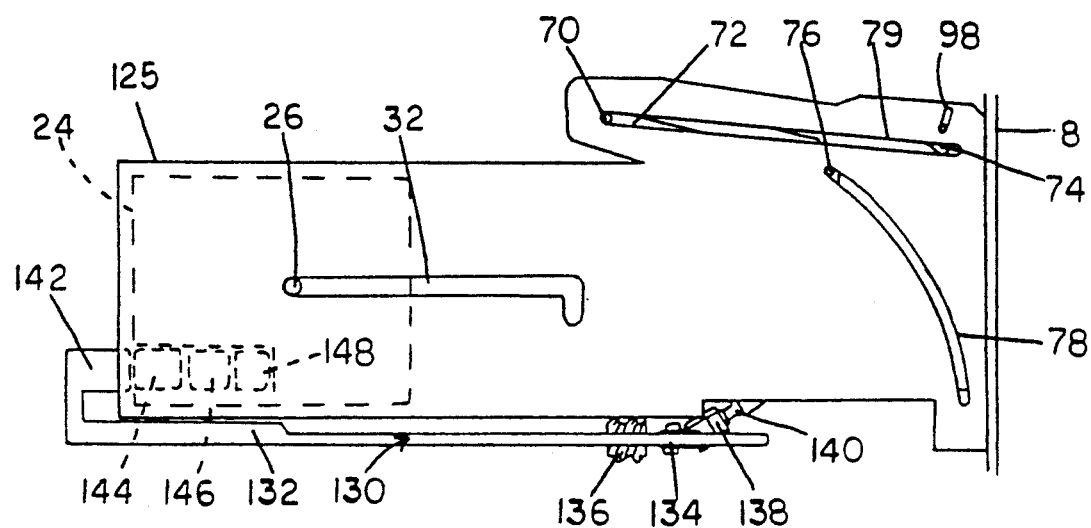
FIG. 5 is a partial side view of the radio and housing with the door in an open position.
Figure 7:
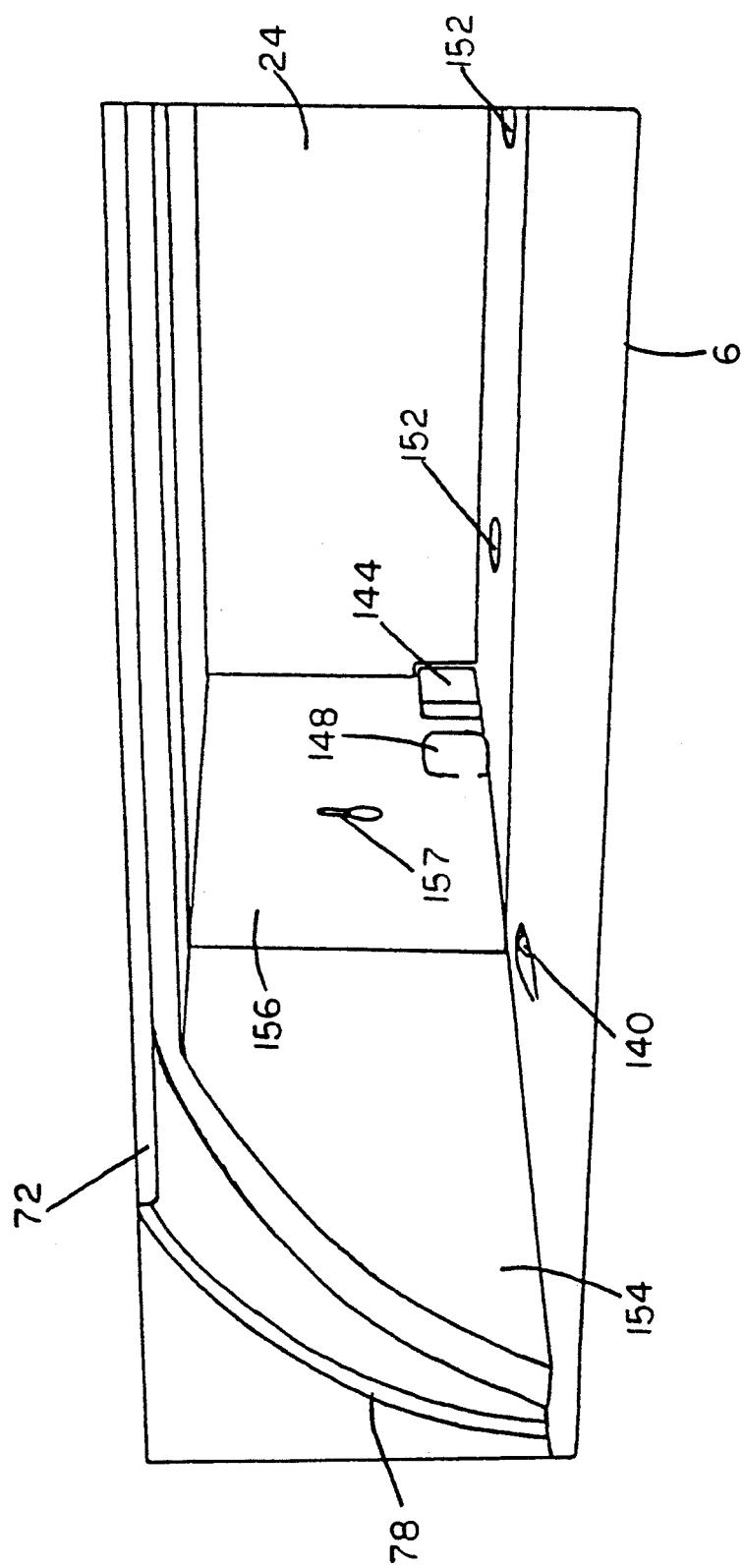
FIG. 7 is a perspective view of an interior of the housing when the door is open.

In reverse operation, when the radio is moved to the storage position (i.e. after the ignition has been turned off), the housing and the radio move as far rearward as possible, thus exposing heads 140 (discussed in detail in relation to FIGS. 4, 5 and 7). The radio remains recessed for a short time allowing an authorized user, who possesses the appropriate tools, to use the tools to turn the heads 140. After that short time has elapsed, the housing and radio continue to move forward and the door begins to close. The housing and radio move forward by a sufficient distance to obstruct the access to the heads 140. When the door is fully closed, the housing and radio move forward again so that the front of the radio is located very close to an interior of the door. As the housing and radio continue to move forward, the catch 118 drops into the slot 121 and shortly thereafter abuts the projections 119. As the catch 118 moves forward, it pushes the wedge 110 forward also, thereby allowing pins 114 to move upward until they touch the bottom of the housing 24. The housing 24, the radio 4 and the wedge 110 continue to move forward until the openings 152, 150 in the housing and radio respectively are aligned with the pins 114 whereupon the springs 116 cause the pins to be reinserted into those openings, locking the radio in the storage position as shown in FIGS. 1, 3 and 4. By operation of the various springs, the lock 74, the locking pin 104, the catch 118 and the pins 114 return to the position shown in FIGS. 3 and 4.

The pins 114 and the catch 118 are added anti-theft features. The pins 114 prevent the radio from being moved forward or rearward even if the radio can otherwise be unattached from the housing. The catch 118 prevents the housing from being moved forward in the event that an unauthorized person desired to remove both the radio and housing together.

The radio becomes locked in the storage position even if the heads 140 have been rotated to release the radio. Therefore, the owner must turn the ignition on once again before the radio may be removed. Should the door be obstructed while it is closing, the second motor 54 will automatically reverse the door. At the same time, the third motor 81 will be activated to unlock the door and equipment. The radio will then come forward and will remain in the forward position even though the ignition is off. It will move rearward again only after the ignition has been turned on and is once again turned off.

Also shown in FIG. 4 is a rod 124 connecting the two gears 52 on the two sides 28, 30 of the housing 24. In addition, a rod 126 extends between the arms 94 and provides abutment means for the block 90 so that as the rod 126 is moved upward, the arms 94 move upward simultaneously.

In FIGS. 4 and 5, there is shown attachment means 130 for attaching the radio 4 to the housing 24. There is one attachment means 130 for each side of the radio. Each attachment means 130 has an L-shaped rod 132 extending from a rear of the housing, beneath the housing, to a front of the radio. A forward portion 134 of the rod 132 is threaded. The threaded portion 134 is mounted to engage a threaded cylinder 136. The threaded cylinder is pivotally mounted on a universal joint 138, said joint having a head 140. The head 140 is designed to be turned by a screwdriver (not shown) or the like. Preferably, the head 140 contains a depression or elevation of a unique shape corresponding to a head of a tool (not shown), also of a unique shape. For example, the head 140 could have an S-shaped depression therein so that a tool having a corresponding S-shape would have to be used to turn the head. As the head is turned in an appropriate direction, the rod 132 either moves forward or rearward, relative to the housing and radio, as desired. As each rod 132 is moved forward by an appropriate distance, a rear portion 142 of the rod 132 pushes a block 144 forward against a spring-mounted projection 146 which is attached to the radio 4. Located in front of the projection 146 is a projection 148 that is mounted on the housing 24. The projection 146 is tapered towards a rear of the radio. When the radio is being inserted into the housing, the projection 146 is depressed into the radio as the projection overrides the projection 148. Once the projection 146 is located between the projection 148 and the block 144, the radio cannot be pulled forward relative to the housing without again turning the head 140 to move each of the rods 132 forward and repeating the process described above.

Figure 6:
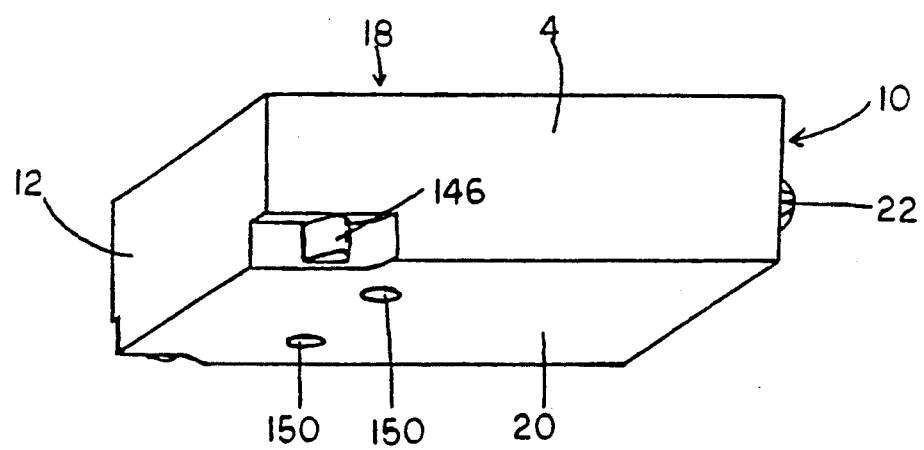
FIG. 6 is a perspective view of the radio.

In FIG. 6, there is shown the spring-mounted projection 146 at the two rear corners of the radio 4. In addition, the two openings 150 in the bottom of the radio for receiving the pins 114 are shown.

In FIG. 7, there is shown a perspective view of the opening 6 with the door open and the radio removed. In a rear corner of the housing 24, the projection 148 and the block 144 can be seen. Also, openings 152 in the housing 24 corresponding to openings 150 in the radio 4 are shown. One of the heads 140 as well as one of the grooves 78 for guiding the door are also visible. It can be seen that a side wall 154 is located so that it is substantially flush with a side wall 156 of the housing 24. There is an identical side wall 154 (not shown) on the other side of the opening 6. The purpose of the side walls 154 is to maintain the radio in alignment with the opening 6 as the radio moves forward. The walls 154 are tapered as the door 72 is larger than the opening 6 and the tapering of the walls 154 allows for movement of the door 72 during opening and closing. A slot 157 receives the projection 26 (not shown)

Figure 8:
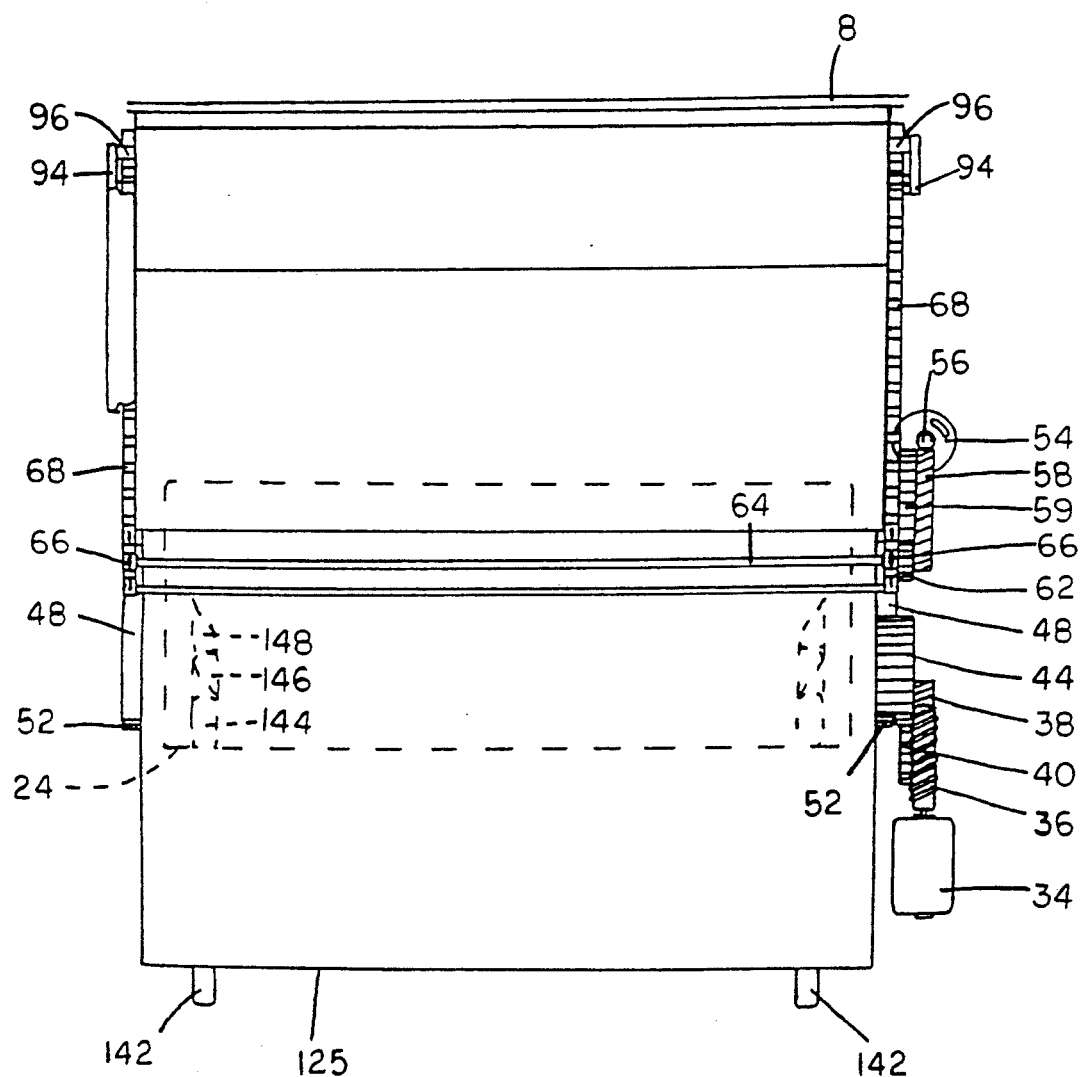
FIG. 8 is a top view of the housing, radio and drive system.

In FIG. 8, there is shown a top view of the housing with the radio in a rearward position. The tapered shape of the projection 146 can be readily seen in this view. Also, while not shown in FIG. 8, the upper lock 74 extends across the full width of the door.

Figure 9:
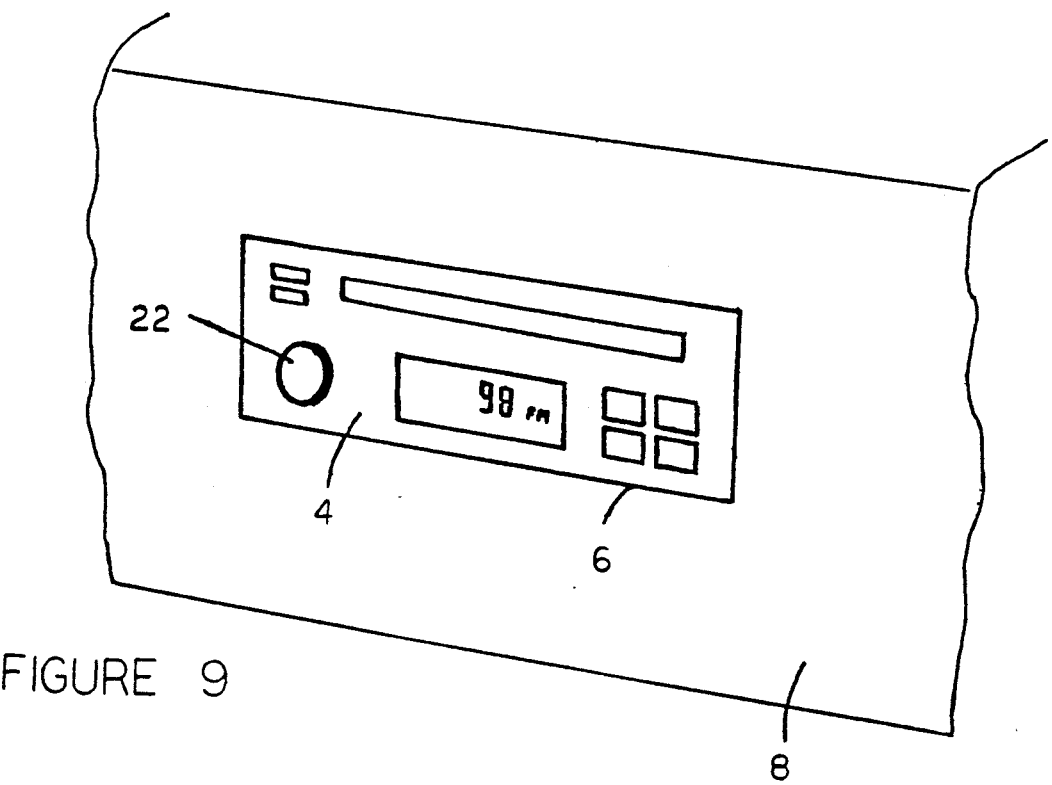
FIG. 9 is a partial perspective view of the radio in a forward position within an opening in a dash.
Figure 10:
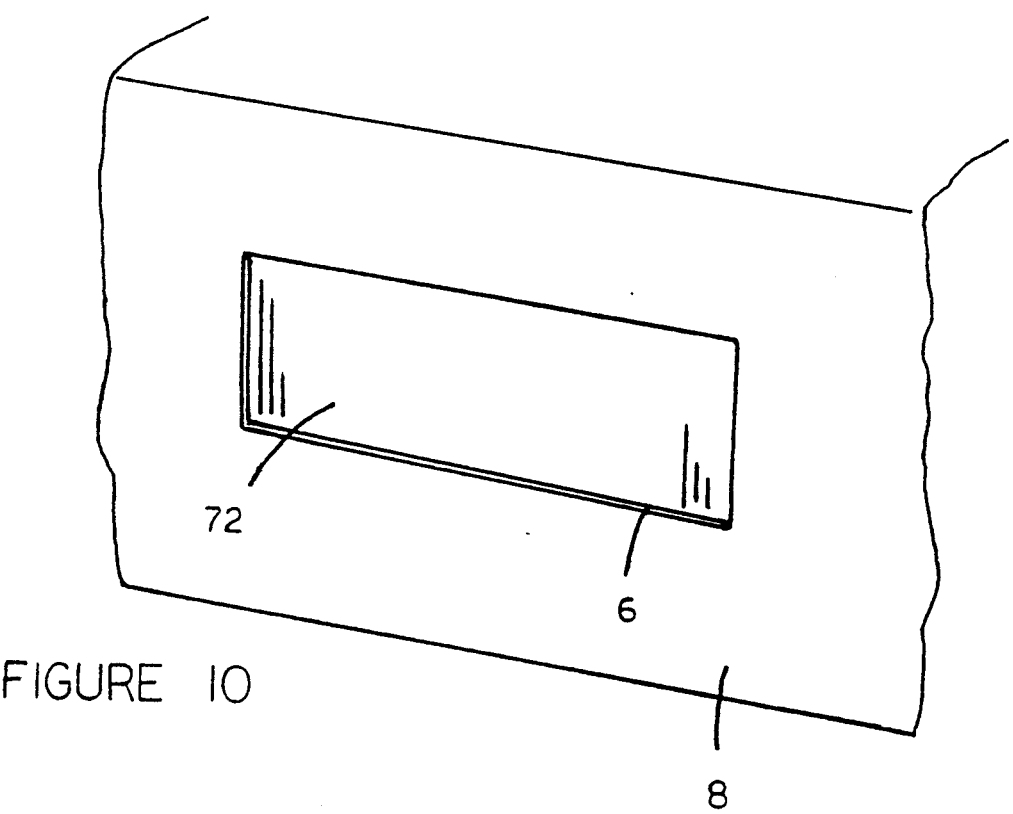
FIG. 10 is a partial perspective view of the opening when the door is closed.

In FIG. 9, there is shown a front view of the opening 6 with the door (not shown) open and the radio in a forward position. In FIG. 10, there is shown the same view as that shown in FIG. 9 except that the radio has been moved rearward and the door 72 is closed. There is a slight indentation between the surface of the door 72 and the surface of the rest of the dash 8. That indentation could be eliminated by designing the door with a raised central portion as shown in FIG. 3.

Figure 11:
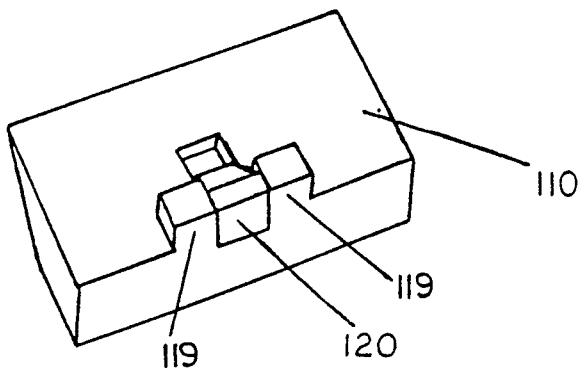
FIG. 11 is a perspective view of a wedge on a bottom of the housing when viewed from a top.
Figure 12:
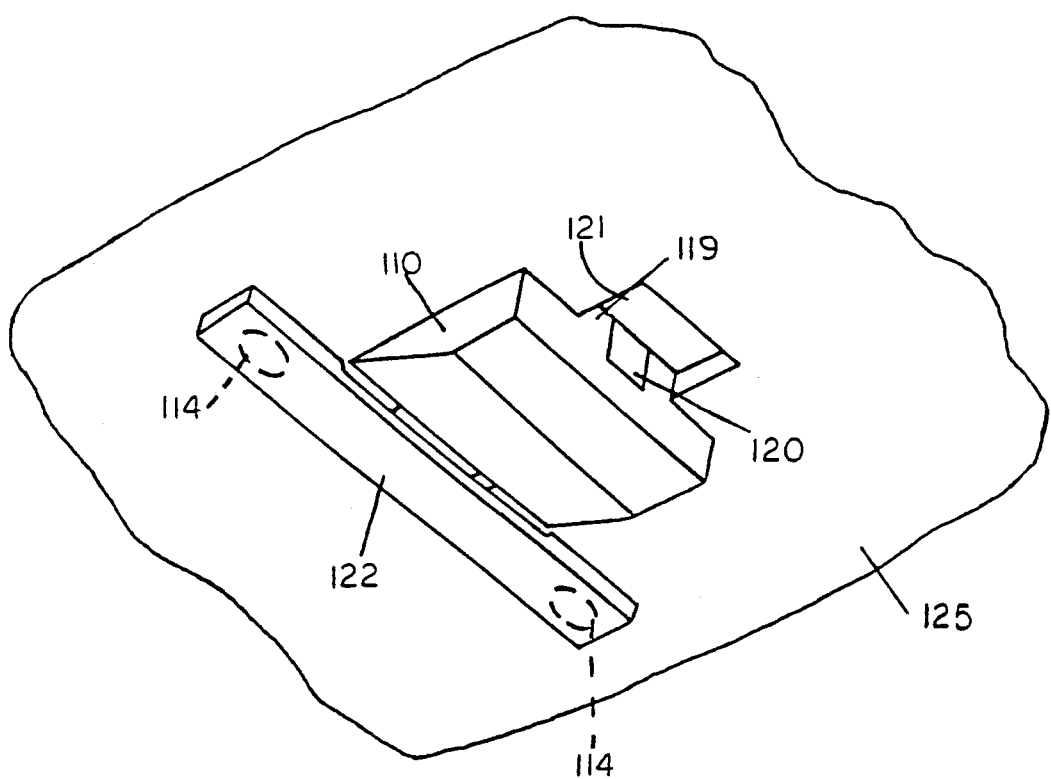
FIG. 12 is a perspective view of the wedge when viewed from a bottom and affixed to a bottom of the housing.
Figure 13:
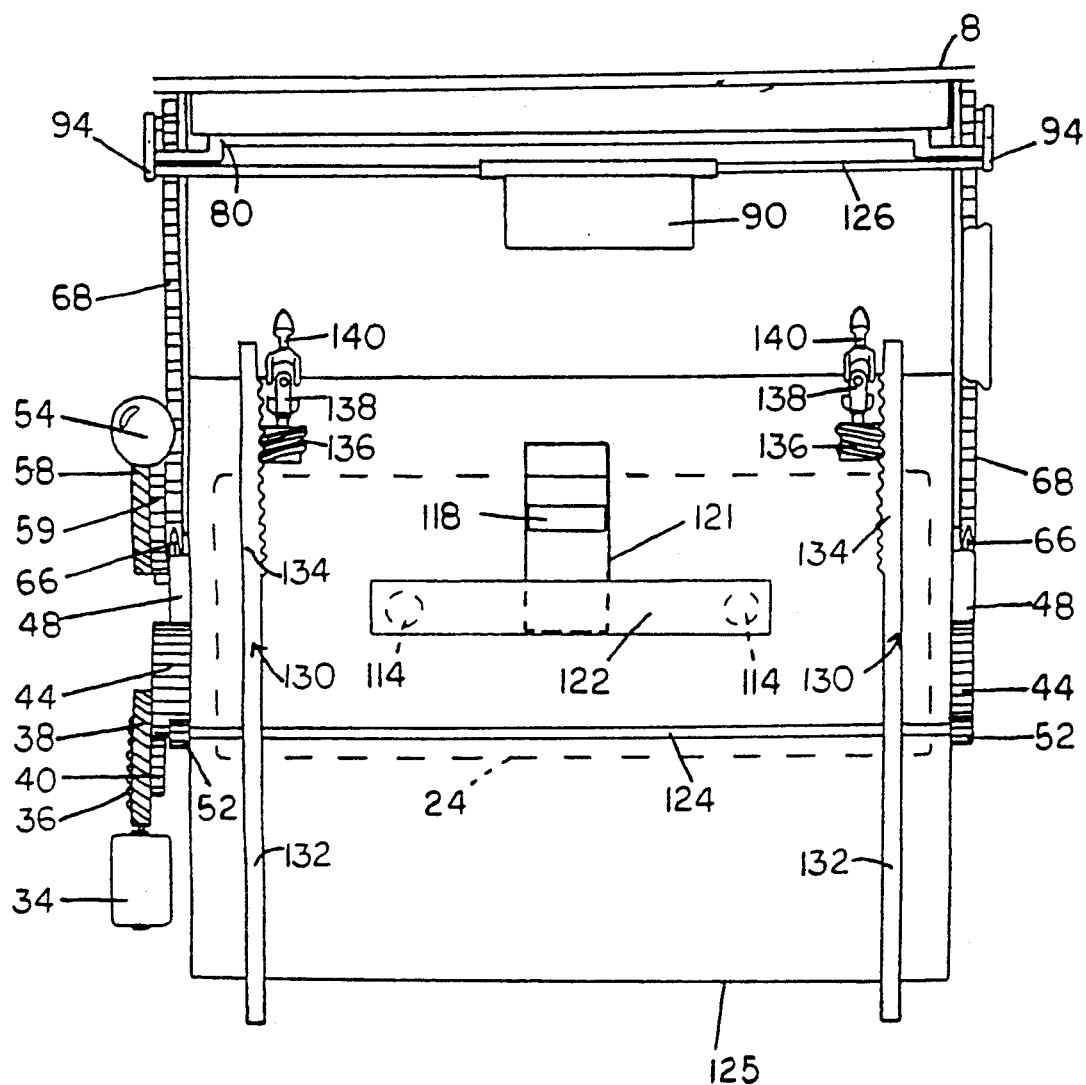
FIG. 13 is a bottom view of the housing with the wedge removed.

In FIG. 11, there is shown a perspective view of a wedge 110 located at a central portion of the housing 24 when viewed from the top. FIG. 12 shows the same wedge when viewed from the bottom and FIG. 13 shows the bottom of the housing with the wedge 110 removed to expose the catch 118. These figures have been discussed previously.

The motors and control means of the present invention are preferably connected directly to the ignition of the motor vehicle with which the mounting is used. Alas, when the ignition switch is turned on, the door opens and the radio or other audio equipment automatically moves forward to the position shown in FIG. 9. Similarly, when the ignition switch is turned off, the radio automatically moves rearward and the door is closed to the position shown in FIG. 10. From FIG. 9, it can be seen that a user of the radio has completely unobstructed access to the radio when the radio is in the forward position. Also, when the door is closed and the door is flush with the remainder of the dash, it would be difficult to determine whether or not the motor vehicle had in fact a radio. Further, since the radio moves forward briefly after the door is closed so that it is located immediately behind the door, if a person decided to smash the door, the radio itself would become damaged as it is located so close to the door. The last result that a thief would want would be to damage the valuable article that he or she is attempting to steal. As the door is slightly larger than the opening, it would be difficult to pry the door out of position. Even if that occurred, it would be extremely difficult to separate the radio from the housing. If the radio could not be separated from the housing, it could not be removed from the dash as the opening in the dash would be too small to allow the radio and the housing to be pulled through the opening. Preferably, the housing is connected to the fire wall (not shown) of the motor vehicle for greater security.

As mentioned previously, if, during the closing of the door the movement of the door is obstructed, the motors for the door and the equipment are connected to control means to automatically reverse and to open all locks and return to the open position. One way to have the motors reverse is to use a relay switch in the circuit between the motors and the door. When the door stops, the resistance in the circuit drops and the current through the relay switch causes the motors to reverse.

What we claim as our invention is:

1. A secure mounting for using and storing audio equipment in a motor vehicle having a dash with an outer surface and a suitable opening therein and sufficient space behind said dash to accommodate the mounting and the equipment, said equipment having a front, rear, two sides, top and bottom with adjustment means on a front thereof, said motor vehicle having a power source for moving the mounting and an ignition, said equipment having attachment means thereon, said mounting comprising:

(a) a movable housing affixed to attachment means on said equipment, a front portion of said equipment extending beyond said housing, said housing and said equipment being immovable relative to one another;

(b) said movable housing having two projections thereon, there being one projection on each side thereof to extend outward therefrom, two guide means one on each side of said equipment, each guide means being sized and located to receive one projection, each guide means being supported independently of each projection, each projection being mounted to move vertically a predetermined distance relative to said equipment, each projection movable within each guide means, mechanical means for moving each projection forward and rearward within said guide means as desired, thereby moving said equipment forward and rearward;

(c) power means connected between said power source and said mechanical means to move said housing and said equipment between a rearward rest position and a forward operating position, said equipment being immovable relative to said housing;

(d) in said forward position, at least said front of said equipment extends into said opening, said rear and said housing remaining behind said opening, and in said rearward position, said front of said equipment being located behind said opening, (e) said movable housing being larger than said opening so that if said projections are severed, said equipment and said housing are too large to be pulled through said openings.

2. A mounting as claimed in claim 1 wherein there are control means and switching means to move said equipment automatically between a rearward position and a forward position.

3. A mounting as claimed in claim 2 wherein there is a movable door, said door being mounted to close said opening when the equipment is not in use and to be removed from said opening when said equipment is in use.

4. A mounting as claimed in claim 3 wherein the door is mounted as an overhead door that moves upward and rearward away from said opening when the door is opened and downward and forward to cover said opening when the door is closed.

5. A mounting as claimed in claim 4 wherein the mounting is controlled to move the equipment forward briefly towards the door after the door is closed and to move the equipment rearward briefly away from the door just before the door opens.

6. A mounting as claimed in claim 5 wherein there is at least one lock to lock the door when it is in a closed position.

7. A mounting as claimed in claim 6 wherein the door has two locks that automatically lock the door when it moves to a closed position, one lock being located along a top edge of the door and another lock being located along a bottom edge of the door.

8. A mounting as claimed in claim 5 wherein the equipment is attached to said housing by locking means that cannot be released without special tools.

9. A mounting as claimed in claim 3 wherein each projection extends into a slot located in an arm which, in turn, is pivotally mounted and connected by gears to said power source, said power source being located to rotate said arm in an arcuate manner about a pivot point, gears connecting the arm on each side of the equipment so that the two arms rotate synchronously, thereby causing said projection to move within said slot and, in turn, causing the equipment to move forward, or rearward, as desired.

10. A mounting as claimed in claim 9 wherein the guide means is L-shaped, the slot having a relatively long horizontal portion and a relatively short vertical portion, said projection being located in said vertical portion when the equipment is in use with a front portion thereof located in said opening, said projection sliding along said horizontal portion when the equipment is being moved forward or rearward relative to said opening.

11. A mounting as claimed in claim 3 wherein the power means are two electric motors, one to move the equipment and the other to move the door, said electric motors being reversible, the control means controlling the electric motor for the door so that it will automatically reverse when the door strikes an obstruction during closing before the door is fully closed.

12. A mounting as claimed in any one of claims 2, 4 or 5 wherein the switching means and control means are connected to the ignition, of the motor vehicle so that when the ignition of the motor vehicle is turned on, the equipment moves automatically from the rearward position to the forward position and when the ignition of the motor vehicle is shut off, the equipment moves from the forward position to the rearward position.

13. A mounting as claimed in any one of claims 3, 4 or 5 wherein the door has a central portion with a raised surface, the size of said raised surface being substantially the same as a size of said opening, so that when said door is closed said raised surface is substantially flush with said outer surface of said dash that surrounds said opening.

14. A mounting as claimed in any one of claims 5, 6 or 7 wherein the housing forms an outer shell around part of the equipment and there are openings in the bottom of the equipment that are aligned with openings in the bottom of the housing, with pins that are automatically inserted into said openings when the equipment is in a storage position and automatically are removed from said openings when the equipment is moved from a storage position to an operating position.

* * * * *